Sept. 30, 1924.
F. J. TERWILLIGER
ELECTRIC GENERATOR
Filed July 11, 1923
1,509,884
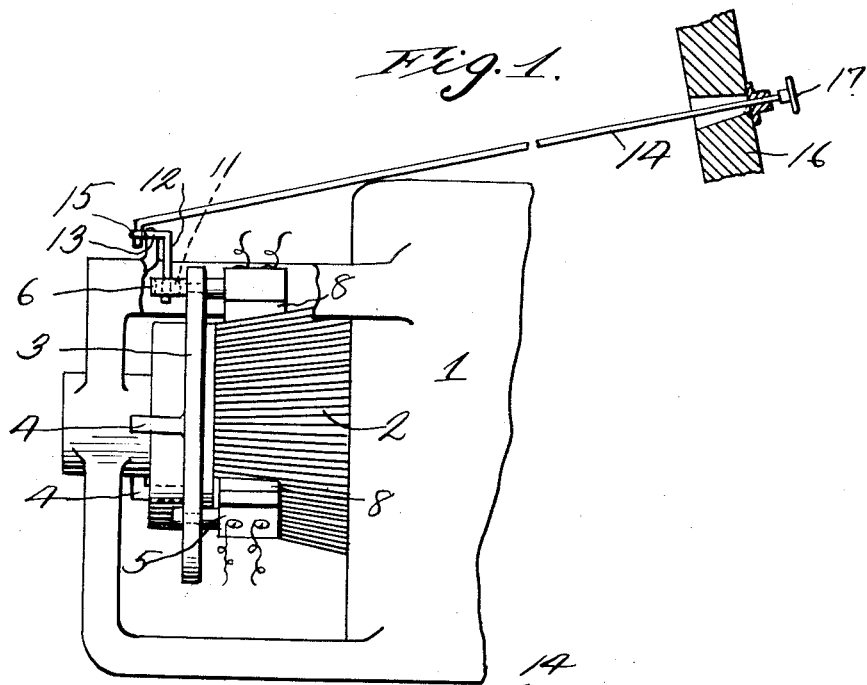
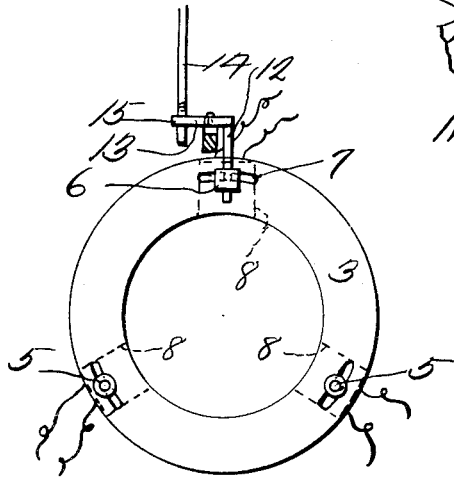
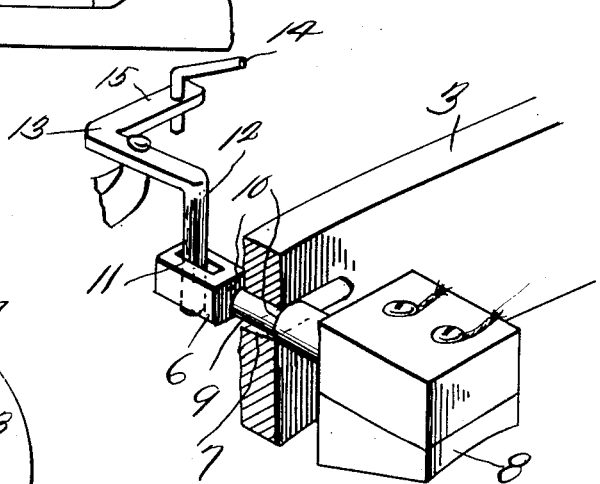
Inventor
F. J. Terwilliger
By D. Swift
Attorney Patented Sept. 30, 1924.

1,509,884

UNITED STATES PATENT OFFICE.

FRED J. TERWILLIGER, OF MONTAGUE, CALIFORNIA.

ELECTRIC GENERATOR.

Application filed July 11, 1923. Serial No. 650,855.

*To all whom it may concern:*

Be it known that I, FRED J. TERWILLIGER, a citizen of the United States, residing at Montague, in the county of Siskiyou, State of California, have invented a new and useful Electric Generator; and I do hereby declare the following to be a full, clear, and exact description of the invention, such as will enable others skilled in the art to which it appertains to make and use the same.

The invention relates to electric generators of the type used in connection with motor drive vehicles, and the type where the amperage charge varies according to the speed, and has for its object to provide a device of this character wherein one of the brushes which contacts with the commutator may be advanced or retarded, thereby allowing the amperage charge to be regulated, preferably from the driver's seat, thereby preserving the battery and doing away with having the battery charged at service stations during the life of the battery. At the present time brushes are set stationary on a brush holder of automobile generators, and the amperage charge varies according to the speed, consequently, sometimes at high speed overcharging of the batteries, and at other times, when using all the lights batteries are undercharged, therefore the invention is primarily designed to overcome the above difficulty.

A further object is to provide the brush holder with a concentric slot having a member slidably mounted therein for carrying one of the brushes, which engages the commutator, said member being controlled, preferably through leverage mechanism from the instrument board of the automobile, and within easy reach of the operator of the automobile.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of a portion of an electric generator, showing the device applied thereto.

Figure 2 is an elevation of the brush carrying ring, showing the adjustable brush carried thereby.

Figure 3 is a detail perspective view of the adjustable brush, a portion of the brush carrying ring and the brush controlling mechanism.

Referring to the drawing, the numeral 1 designates a conventional form of generator of the type used in connection with motor driven vehicles and 2 the commutator thereof. Disposed around the commutator 2 is a brush ring 3, which may be supported in any suitable manner, preferably by brackets 4. The brush holder ring 3 is provided with brush holders 5 and 6. The brush holders 5 are fixed to the ring 3, however the brush holder 6 is slidably mounted in a concentric slot 7 whereby the brush 8 carried thereby may be advanced or retarded for changing the amperage of the electric energy generated by the generator. If advanced the amperage is increased, and if retarded the amperage is decreased, consequently the operator may maintain a constant amperage in the battery of the automobile at all times, thereby obviating recharging of the battery. The brush holder 6 is provided with a reduced portion 9, which is slidably mounted in the concentric slot 7 with its shoulders 10 in engagement with opposite sides of the brush ring 3, therefore it will be seen that the brush will be accurately moved concentrically of the commutator 2 and insuring proper engagement of the brush with the commutator.

The outer end of the brush holder 6 is provided with an elongated slot 11, in which slot the downwardly extending arm 12 of the bell crank lever 13 is disposed, therefore it will be seen that by manipulating the connecting rod 14, which is connecting to the arm 15 of the bell crank lever, the brush holder 6 may be advanced or retarded. Connecting rod 14 extends rearwardly through the instrument board 16 of the automobile and is provided with a handle 17 adapted to be grasped by the operator.

From the above it will be seen that a brush holder is provided for generators of automobiles, which brush holders may be moved thereby changing the amperage of the electric energy generated by the generator, and consequently the necessity of recharging the battery of the automobile may be obviated and a constant amperage maintained even though the speed of operation of the generator varies.

The invention having been set forth what is claimed as new and useful is:—

The combination with a generator brush, a brush carrying ring, of means for mounting said brush on said ring, said means comprising a shaft, a reduced portion carried by said shaft and extending through an arcuate slot in the ring, said reduced portion of the shaft terminating in an enlarged eye engaging the outer side of the ring and preventing inward movement of the shaft, a bell crank lever, and an arm carried by said bell crank lever and extending through said eye and forming means whereby upon a movement of the bell crank lever, said brush will be concentrically moved.

In testimony whereof I have signed my name to this specification in the presence of two subscribing witnesses.

FRED J. TERWILLIGER.

Witnesses:
 AUGUST JANSON,
 OLIVE KNIGHT.